(12) United States Patent
Lv

(10) Patent No.: US 9,588,387 B2
(45) Date of Patent: Mar. 7, 2017

(54) FAST TESTING SWITCH DEVICE AND THE CORRESPONDING TFT-LCD ARRAY SUBSTRATE

(71) Applicant: Shenzhen China Star Optoelectronics Technology Co., Ltd., Shenzhen, Guangdong (CN)

(72) Inventor: Qibiao Lv, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 345 days.

(21) Appl. No.: 14/233,750

(22) PCT Filed: Jul. 18, 2013

(86) PCT No.: PCT/CN2013/079615
§ 371 (c)(1),
(2) Date: Jan. 19, 2014

(87) PCT Pub. No.: WO2015/003405
PCT Pub. Date: Jan. 15, 2015

(65) Prior Publication Data
US 2015/0014686 A1   Jan. 15, 2015

(30) Foreign Application Priority Data

Jul. 10, 2013   (CN) .......................... 2013 1 0288811

(51) Int. Cl.
*H01L 21/66*   (2006.01)
*G02F 1/1362*   (2006.01)
*G09G 3/00*   (2006.01)

(52) U.S. Cl.
CPC ....... *G02F 1/136259* (2013.01); *G09G 3/006* (2013.01); *G02F 2001/136254* (2013.01);
(Continued)

(58) Field of Classification Search
None
See application file for complete search history.

(56) References Cited

U.S. PATENT DOCUMENTS 6,956,396 B2 * 10/2005 Lai .......................... G09G 3/006
324/760.02
7,298,165 B2 * 11/2007 Chang ............... G02F 1/136204
324/760.02
(Continued)

*Primary Examiner* — Jermele M Hollington
*Assistant Examiner* — Douglas X Rodriguez
(74) *Attorney, Agent, or Firm* — Andrew C. Cheng

(57) ABSTRACT

A fast testing switch device arranged on a TFT-LCD array substrate is disclosed. The fast testing switch device switches the testing signals for testing a display area of the TFT-LCD array substrate. The fast testing switch device includes at least a first switch TFT. The gate of the first switch TFT connects to one control chip and a testing block for receiving the switch control signals from the testing block or the turn-off control signals from the control chip. The source of the first switch TFT connects to one data testing line or one gate testing line, and the drain of the first switch TFT connects to the corresponding data line or gate line of the display area. In addition, a corresponding TFT-LCD array substrate is also disclosed. The above configuration not only can achieve the narrow-bezel design but also can enhance the yield rate of the TFT-LCD array substrate.

12 Claims, 3 Drawing Sheets

(52) U.S. Cl.
CPC ............ *G02F 2001/136268* (2013.01); *G09G 2300/0426* (2013.01)

(56) References Cited

U.S. PATENT DOCUMENTS

| | | | | |
|---|---|---|---|---|
| 7,379,040 | B2* | 5/2008 | Kitazoe | G02F 1/136213 |
| | | | | 345/100 |
| 8,624,243 | B2* | 1/2014 | Koo | G02F 1/1309 |
| | | | | 257/48 |
| 2006/0238450 | A1* | 10/2006 | Onodera | G02F 1/1309 |
| | | | | 345/60 |
| 2008/0265250 | A1* | 10/2008 | Huang | G02F 1/136204 |
| | | | | 257/48 |
| 2009/0213288 | A1* | 8/2009 | Chen | G02F 1/1303 |
| | | | | 349/43 |
| 2012/0262184 | A1* | 10/2012 | Shen | G09G 3/006 |
| | | | | 324/537 |
| 2013/0265069 | A1* | 10/2013 | Deng | G09G 3/006 |
| | | | | 324/750.3 |

* cited by examiner

US 9,588,387 B2

FAST TESTING SWITCH DEVICE AND THE CORRESPONDING TFT-LCD ARRAY SUBSTRATE

This application claims priority to China Patent Application No. 201310288811.1 filed on Jul. 10, 2013 entitled, FAST TESTTING SWITCH DEVICE AND THE CORRESPONDING TFT-LCD ARRAY SUBSTRATE, all of the disclosures of which are incorporated herein by reference in their entirety.

BACKGROUND OF THE INVENTION

1. Field of the Invention

Embodiments of the present disclosure relate to Thin Film Transistor-Liquid Crystal Display (TFT-LCD) technology, and more particularly to a fast testing switch device and the corresponding TFT-LCD array substrate.

2. Discussion of the Related Art

In a manufacturing process of TFT-LCD panels, internal circuits have to be tested and fixed upon detecting errors, and this process is called as cell test. Generally, a shorting bar below the gate bonding pad and the source bonding pad is adopted to perform the cell test. After the panel has been tested, the lines of the shorting bar are cut by a laser cut process. However, the shorting bar not only results in high cost but also occupies a large space, and thus the narrow-bezel design cannot be achieved. For example, the lines needed for the shorting bar and the laser cut process is approximately 630 μm for the 46 inches TFT-LCD.

SUMMARY

The object of the claimed invention is to provide a fast testing switch device and the corresponding TFT-LCD array substrate, which not only can achieve the narrow-bezel design but also can avoid signal interferences in its normal operations.

In one aspect, a TFT-LCD array substrate includes a display area and a peripheral area surrounding the display area. The display area includes a plurality of gate lines and data lines connecting to TFTs arranged within the display area. The peripheral area includes: a plurality of data testing lines for respectively transmitting data testing signals to each of the data lines in the display area; a plurality of gate testing lines for sending gate testing signals to the gate lines within the display area; a common electrode line for providing a common electrode for the TFTs within the display area; and wherein each of the data testing lines and the gate testing lines include a fast testing switch device for connecting or disconnecting the data testing lines and the gate testing lines with the display area when being controlled by external switch control signals.

Wherein the TFT-LCD array substrate further includes at least one control chip connecting with the fast testing switch device for transmitting turn-off control signals such that the fast testing switch device is in an off state.

Wherein the turn-off control signals are low level signals or ground signals.

Wherein the fast testing switch device includes a first switch TFT, a gate of the first switch TFT connects to one control chip and a testing block for receiving the switch control signals from the testing block or the turn-off control signals from the control chip, a source of the first switch TFT connects to one data testing line or one gate testing line, and a drain of the first switch TFT connects to the corresponding data line or gate line of the display area.

Wherein the fast testing switch device includes a first switch TFT and a second switch TFT, the gate of the first switch TFT connects to the control chip and the testing block for receiving the switch control signals from the testing block and for receiving the switch control signals from the control chip, a source of the first switch TFT connects to one data testing line and gate testing line, a gate of the second switch TFT connects to the gate of the first switch TFT, the source of the second switch TFT connects to the drain of the first switch TFT, and a drain of the second switch TFT connects to the corresponding data line or gate line of the display area.

Wherein the fast testing switch device includes a first switch TFT, a second switch TFT, and a third switch TFT, a gate of the first switch TFT connects to the control chip and the testing block for receiving the switch control signals from the testing block and for receiving the switch control signals from the control chip, a source of the first switch TFT connects to one data testing line and gate testing line, the gate of the second switch TFT connects to the gate of the first switch TFT, the source of the second switch TFT connects to the drain of the first switch TFT, the gate of the third switch TFT connects to the gate of the second switch TFT, the source of the third switch TFT connects to the drain of the first switch TFT, and a drain of the third switch TFT connects to the corresponding data line or gate line of the display area.

Wherein when the first switch TFT receives the switch control signals from the testing block and the switch control signals are first level signals, the gate and drain of the switch TFTs are turn on so as to transmit the data testing signals or/and gate testing signals to the display area, when the first switch TFT receives the switch control signals from the testing block and the switch control signals are the second level signals, the gate and drain of the switch TFTs are turn off so as to stop transmitting the data testing signals or/and gate testing signals to the display area, and when the first switch TFT receives the turn-off control signals from the control chip, the gate and drain of each of the switch TFTs are turn off.

In another aspect, a TFT-LCD array substrate includes a display area and a peripheral area surrounding the display area. The display area includes a plurality of gate lines and data lines connecting to TFTs arranged within the display area. The peripheral area includes: a plurality of data testing lines for respectively transmitting data testing signals to each of the data lines in the display area; a plurality of gate testing lines for sending gate testing signals to the gate lines within the display area; a common electrode line for providing a common electrode for the TFTs within the display area; at least one control chip connecting with a fast testing switch device for transmitting turn-off control signals such that the fast testing switch device is in an off state; and wherein each of the data testing lines and the gate testing lines include the fast testing switch device for connecting or disconnecting the data testing lines and the gate testing lines with the display area when being controlled by external switch control signals.

Wherein the turn-off control signals are low level signals or ground signals.

Wherein the fast testing switch device includes a first switch TFT, the a of the first switch TFT connects to one control chip and a testing block for receiving the switch control signals from the testing block or the turn-off control signals from the control chip, a source of the first switch TFT connects to one data testing line or one gate testing line, and a drain of the first switch TFT connects to the corresponding data line or gate line of the display area.

Wherein when the first switch TFT receives the switch control signals from the testing block and the switch control signals are first level signals, the gate and drain of the first switch TFT are turn on so as to transmit the data testing signals or/and gate testing signals to the display area, when the first switch TFT receives the switch control signals from the testing block and the switch control signals are second level signals, the gate and drain of the first switch TFT are turn off so as to stop transmitting the data testing signals or/and gate testing signals to the display area, and when the first switch TFT receives the turn-off control signals from the control chip, the gate and drain of the first TFTs are turn off.

Wherein the fast testing switch device includes a first switch TFT and a second switch TFT, a gate of the first switch TFT connects to the control chip and the testing block for receiving the switch control signals from the testing block and for receiving the switch control signals from the control chip, a source of the first switch TFT connects to one data testing line and gate testing line, the gate of the second switch TFT connects to the gate of the first switch TFT, the source of the second switch TFT connects to the drain of the first switch TFT, and a drain of the second switch TFT connects to the corresponding data line or gate line of the display area.

Wherein when the first switch TFT receives the switch control signals from the testing block and the switch control signals are first level signals, the gate and drain of the first and the second switch TFTs are turn on so as to transmit the data testing signals or/and gate testing signals to the display area, when the first switch TFT receives the switch control signals from the testing block and the switch control signals are the second level signals, the gate and drain of the first and the second switch TFTs are turn off so as to stop transmitting the data testing signals or/and gate testing signals to the display area, and when the first switch TFT receives the turn-off control signals from the control chip, the gate and drain of the first and the second switch TFTs are turn off.

Wherein the fast testing switch device includes a first switch TFT, a second switch TFT, and a third switch TFT, a gate of the first switch TFT connects to the control chip and the testing block for receiving the switch control signals from the testing block and for receiving the switch control signals from the control chip, a source of the first switch TFT connects to one data testing line and gate testing line, the gate of the second switch TFT connects to the gate of the first switch TFT, the source of the second switch TFT connects to the drain of the first switch TFT, the gate of the third switch TFT connects to the gate of the second switch TFT, the source of the third switch TFT connects to the drain of the first switch TFT, and a drain of the third switch TFT connects to the corresponding data line or gate line of the display area.

Wherein when the first switch TFT receives the switch control signals from the testing block and the switch control signals are first level signals, the gate and drain of the switch TFTs are turn on so as to transmit the data testing signals or/and gate testing signals to the display area, when the first switch TFT receives the switch control signals from the testing block and the switch control signals are the second level signals, the gate and drain of the switch TFTs are turn off so as to stop transmitting the data testing signals or/and gate testing signals to the display area, and when the first switch TFT receives the turn-off control signals from the control chip, the gate and drain of each of the switch TFTs are turn off.

In another aspect, a fast testing switch device is arranged on a TFT-LCD array substrate, and the fast testing switch device switches testing signals for testing a display area of the TFT-LCD array substrate. The fast testing switch device includes: a first switch TFT, a gate of the first switch TFT connects to one control chip and a testing block for receiving the switch control signals from the testing block or the turn-off control signals from the control chip, a source of the first switch TFT connects to one data testing line or one gate testing line, and a drain of the first switch TFT connects to the corresponding data line or gate line of the display area.

Wherein the fast testing switch device further includes a second switch TFT arranged between the first switch TFT and the display area, the gate of the second switch TFT connects to the gate of the first switchable TFT, the source of the second switch TFT connects to the drain of the first switchable TFT, and the drain of the second switch TFT connects to the corresponding data line or gate line of the display area.

Wherein the fast testing switch device further includes a third switch TFT arranged between the second switch TFT and the display area, the gate of the third switch TFT connects to the gate of the second switchable TFT, the source of the third switch TFT connects to the drain of the second switchable TFT, and the drain of the third switch TFT connects to the corresponding data line or gate line of the display area.

Wherein when the first switch TFT receives the switch control signals from the testing block and the switch control signals are first level signals, the gate and drain of the switch TFTs are turn on so as to transmit the data testing signals or/and gate testing signals to the display area, when the first switch TFT receives the switch control signals from the testing block and the switch control signals are the second level signals, the gate and drain of the switch TFTs are turn off so as to stop transmitting the data testing signals or/and gate testing signals to the display area, and when the first switch TFT receives the turn-off control signals from the control chip, the gate and drain of each of the switch TFTs are turn off.

In view of the above, the TFT-LCD array substrate includes fast testing switch devices for turning on or off the TFTs. As such, the space occupied by the testing lines is decreased so as to achieve the narrow-bezel design.

The control chips transmit turn-off control signals to the fast testing switch devices such that all of the fast testing switch devices are in an off-state when the liquid crystal panel including the TFT-LCD array substrate is in its normal operation.

The fast testing switch device includes at least two switch TFTs. When the liquid crystal panel including the TFT-LCD array substrate is in its normal operation, the data line or gate line of the liquid crystal panel is prevented from short-connection causing by a malfunctioned switch TFT. In this way, the crosstalk can be avoided such that the yield rate of the TFT-LCD array substrate is enhanced.

DETAILED DESCRIPTION OF THE EMBODIMENTS

Embodiments of the invention will now be described more fully hereinafter with reference to the accompanying drawings, in which embodiments of the invention are shown.

Figure 1:
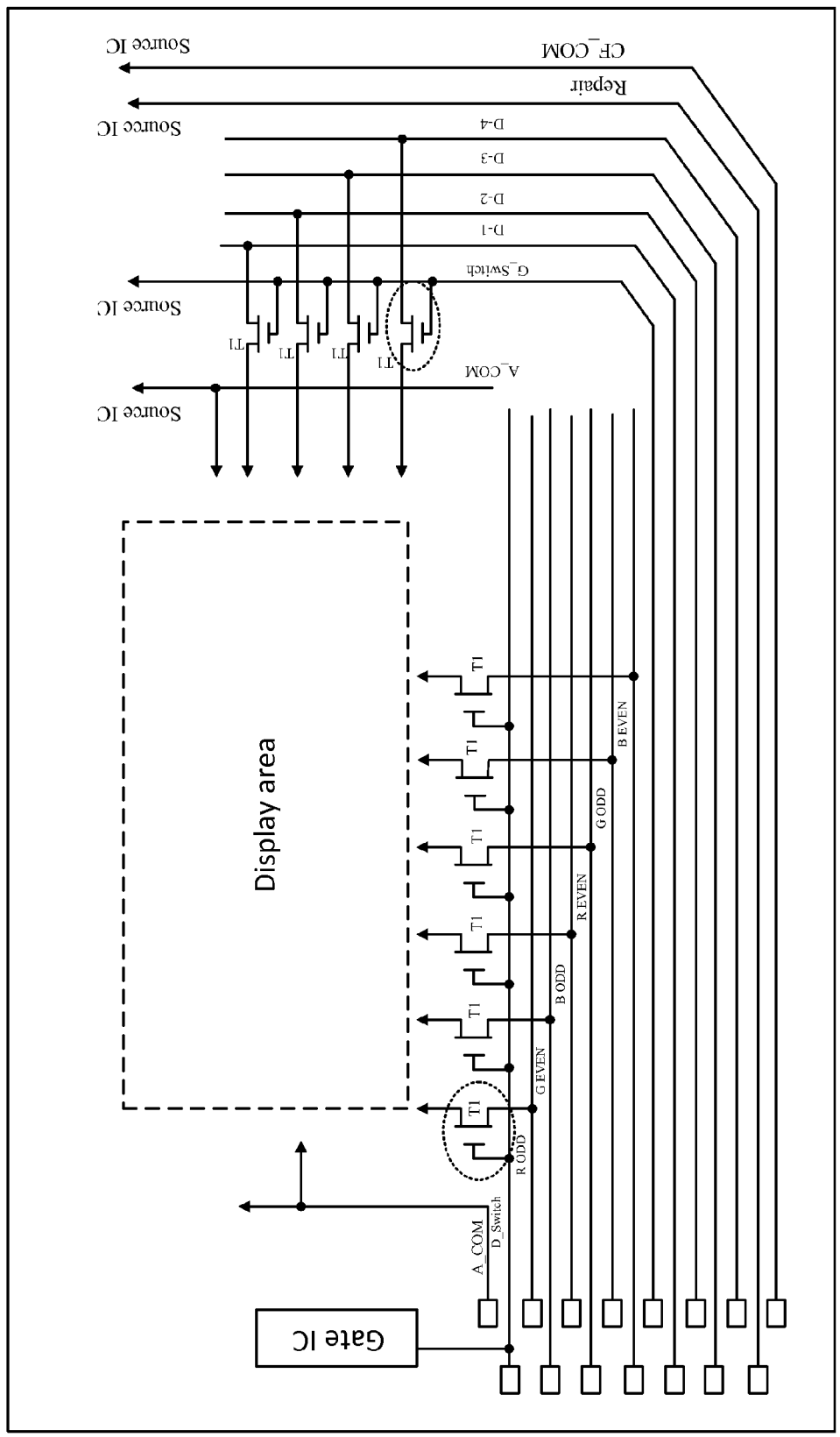
FIG. 1 is a schematic view of a TFT-LCD array substrate in accordance with one embodiment.

FIG. 1 is a schematic view of a TFT-LCD array substrate in accordance with one embodiment. In the embodiment, the TFT-LCD array substrate includes a display area and a peripheral area surrounding the display area. The display area includes a plurality of gate lines and data lines connecting to the TFTs arranged within the display area. Specifically, the display area includes a plurality of gate lines and data lines vertical to each other. Each of the intersection of the data lines and gate lines connects to one TFT unit. Each of the TFT unit includes a TFT, a liquid crystal capacitor, and a storage capacitor. A source of the TFT connects to the data line, and a gate of the TFT connects to the gate line. The configuration of the data lines, gate lines, and TFT units in the display areas are general and thus detail of the configuration is not shown in FIG. 1.

The peripheral area includes a plurality of data testing lines for respectively transmitting data testing signals to each of the data lines in the display area. FIG. 1 shows six data testing lines. Specifically, the six data testing lines include R ODD data testing line, G EVEN data testing line, B ODD data testing line, R EVEN data testing line, G ODD data testing line, and B EVEN data testing line, which respectively corresponds to the testing of R/G/B signal ends.

The peripheral area also includes a plurality of gate testing lines for sending gate testing signals to the gate lines within the display area. FIG. 1 shows four gate testing lines including D-1 gate testing line, D-2 gate testing line, D-3 gate testing line, and D-4 gate testing line.

The peripheral area also includes a common electrode line for providing a common electrode for the TFTs within the display area. Specifically, the common electrode is indicated as "A_Com" in FIG. 1.

Each of the data testing lines and the gate testing lines includes a fast testing switch device for connecting or disconnecting the data/gate testing lines with the display area when being controlled by external switch control signals.

Specifically, as shown in FIG. 1, a testing block (shown as a small square) is arranged on a starting end of each of the testing lines. The testing block is made by metallic material. Upon testing the TFT-LCD array substrate, the external signals are transmitted to the testing block by pins. That is, the external testing signals and switch control signals are transmitted to the testing block and then to the testing lines.

In one embodiment, the fast testing switch device includes a first switch TFT (T1). The gate of T1 connects to one control chip and one testing block for receiving the switch control signals from the testing block or the turn-off control signals from the control chip. The source of T1 connects to one data testing line or one gate testing line. The drain of T1 connects to the corresponding data line or gate line of the display area.

Specifically, when the T1 is arranged on the data testing line, the gate connects to the control chip (gate IC) and one testing module, the source connects to the data testing line, the drain connects to the corresponding data line of the display area. It can be understood that, in other embodiments, the source and the drain of T1 can be switched. Upon performing the testing, T1 receives the control signals (D_Switch) from the testing block for turning on or off the gate and the drain of T1. When the testing is completed and the panel is in its normal operation, T1 has to be in a normal off state such that the T1 is prevented from short-connection caused by the data testing line when the T1 is turn on. Thus, T1 has to receive the turn-off control signals from the control chip so as to be in the normal off state.

When T1 is arranged on the gate testing line, the gate connects to the control chip (source IC) and the testing block, the source connects to the gate testing line, and the drain connects to the corresponding gate line of the display area. It can be understood that, in other embodiment, the source and the drain of T1 can be switched. Upon performing the testing, T1 receives the switch control signals (G_Switch) from the testing block for turning on or off the gate and the drain of T1 so as to test the display area. When the testing is completed, and the panel having the TFT-LCD array substrate is in its normal operation, T1 has to be in the normal off state. As such, the gate lines of the display area connecting to the gate testing line are perverted from short-connection caused by the gate testing line when the T1 is turn on. Thus, T1 has to receive the turn-off control signals from the control chip so as to be in the normal off state.

During the testing of the TFT-LCD array substrate, the gate and the drain of T1 are turn on when then switch control signals (D_Switch or G_Switch) is a first level signal, i.e., high level, such that the data testing signals or/and the gate testing signals are transmitted to the display area. When the switch control signals from the testing module is a second level signals, i.e., low level, the gate and drain are turn off such that T1 stops transmitting the data testing signals or/and gate testing signals.

When the testing is completed and the TFT-LCD is in its normal operation, the control chip transmits the turn-off control signals to T1 to turn off the gate and drain of T1. As such, T1 is in the normal off state. In one embodiment, the turn-off control signals may be low level signals or ground signals.

In this way, by adopting the fast testing switch device in the TFT-LCD array substrate, the space in a periphery of the display area can be effectively utilized. Comparing to the space needed for conventional testing shorting bars and lines needed for laser cut, the space occupied by the testing lines is small. In addition, the laser cut process can also omitted. In one embodiment, the testing of the TFT-LCD array substrate can be executed in an efficient manner by controlling the level of the control switch signals transmitted from the testing block and by sending corresponding testing signals to the testing lines. During the normal operation of the TFT-LCD array substrate, the control chips transmits turn-off signals to the fast testing switch devices such that the fast testing switch device is in the normal off state. As such, the testing lines are disconnected with the display area, and the data lines and the gate lines within the display area are prevented from short-connections.

Figure 2:
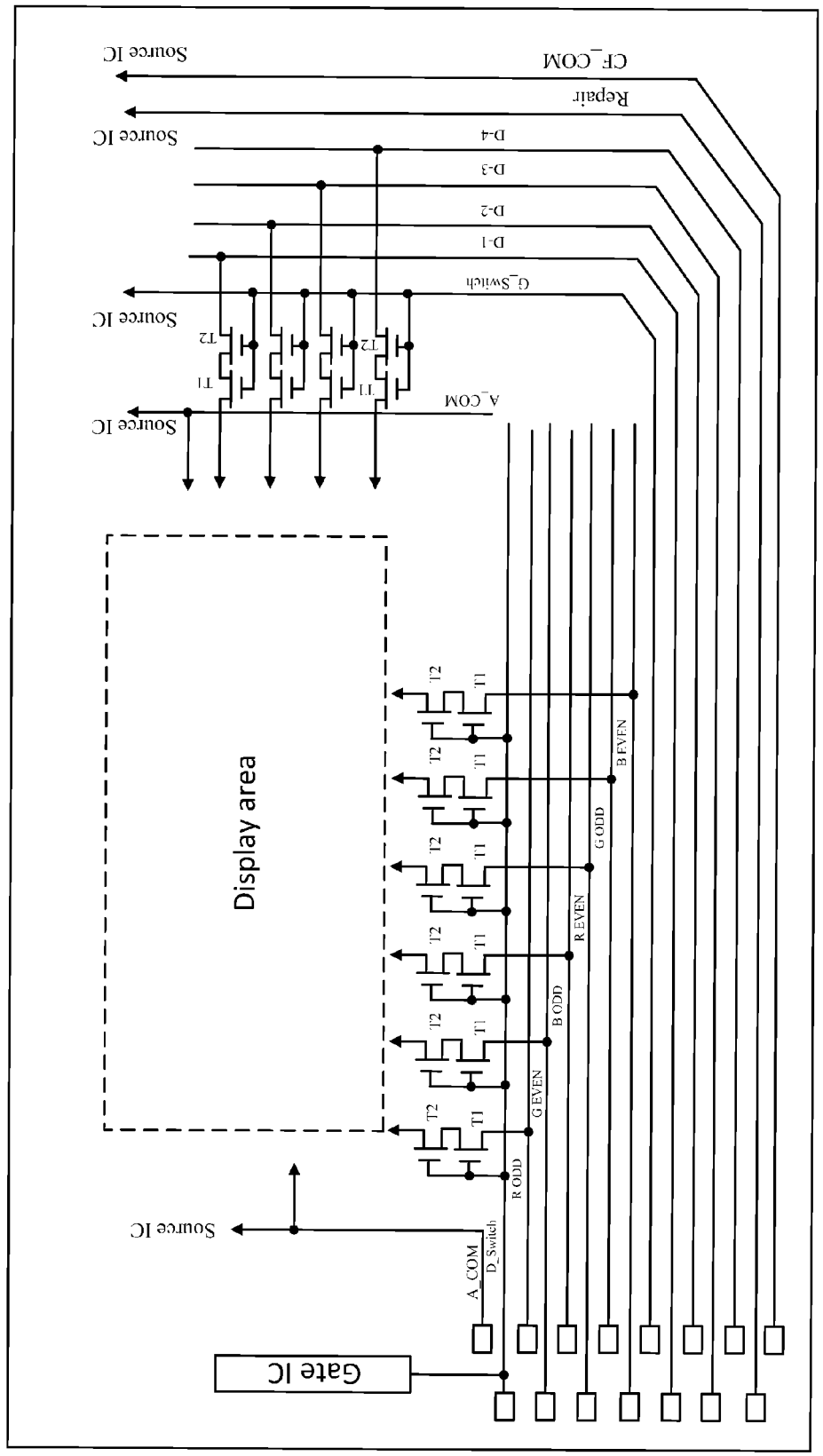
FIG. 2 is a schematic view of a TFT-LCD array substrate in accordance with another embodiment.

FIG. 2 is a schematic view of a TFT-LCD array substrate in accordance with another embodiment. Comparing to the TFT-LCD array substrate in FIG. 1, the fast testing switch device of the TFT-LCD array substrate includes two switch TFTs. Specifically, the fast testing switch device includes the first switch TFT (T1). The gate of T1 connects to one control chip and one testing block for receiving the switch control signals from the testing block or the turn-off control signals from the control chip. The source of T1 connects to one data testing line or one gate testing line.

The fast testing switch device includes a second switch TFT (T2). The gate of T2 connects to the gate of T1, the source of T2 connects to the drain of T1, and the drain of T2 connects to the corresponding data line or gate line of the display area.

Specifically, when the fast testing switch device is arranged on the data testing line, the gate of T1 connects to the control chip (gate IC) and the testing block. T1 receives the switch control signals (D_Switch) from the testing block or receives the turn-off control signals from the control chip. The source of T1 connects to the data testing line. The gate of T2 connects to the gate of T1, the source of T2 connects to the drain of T1, and the drain of T2 connects to the corresponding data line of the display area. It can be understood that the source and the drain of T1 can be switched. When the fast testing switch device is arranged on the data testing line, the gate of T1 connects to the control chip (source IC) and the testing block. T1 receives the switch control signals (G_Switch) from the testing block or receives the turn-off control signals from the control chip. The source of T1 connects to the data testing line. The gate of T2 connects to the gate of T1, the source of T2 connects to the drain of T1, and the drain of T2 connects to the corresponding gate line of the display area. It can be understood that the source and the drain of T1 can be switched.

During the testing of the TFT-LCD array substrate, the gate and the drain of T1 and T2 are turn on when then switch control signals (D_Switch or G_Switch) from the testing block is the first level signal, i.e., high level, such that the data testing signals or/and the gate testing signals are transmitted to the display area. When the switch control signals from the testing module is a second level signals, i.e., low level, the gate and drain of T1 and T2 are turn off such that T1 and T2 stop transmitting the data testing signals or/and gate testing signals.

When the testing is completed and the TFT-LCD is in its normal operation, the control chip transmits the turn-off control signals to T1 to turn off the gate and drain of T1. As such, T1 is in the normal off state. In one embodiment, the turn-off control signals may be low level signals or ground signals.

When the testing is completed and the TFT-LCD is in its normal operation, the control chip transmits the turn-off control signals to T1 and T2 to turn off the gate and drain of T1 and T2. As such, T1 and T2 are in the normal off state. In one embodiment, the turn-off control signals may be low level signals or ground signals.

It can be understood that, in other embodiments, the fast testing switch device includes at least two switch TFTs, such as three switch TFTs.

It can be understood that electrical leakage might happen while only one switch TFT is adopted in the fast testing switch device. When the testing is completed and the panel having the TFT-LCD array substrate is in its normal operation, it is possible that the gate lines and the data lines connecting to one testing line (gate testing line or data testing line) are short-connected due to one malfunctioned T1. For example, T1 is always in an on state. Under the circumstance, crosstalk may occur in the TFT-LCD array substrate. Thus, the crosstalk can be avoided by adopting two or at least two switch TFTs in the fast testing switch device. If one of the switch TFT of the fast testing switch device leaks electricity when the panel is in its normal operation, the other switch TFT can still ensure the fast testing switch device is in the off state such that the gate lines or the data lines are prevented from short-connections. As the probability of two switch TFTs simultaneously leaking electricity is low, the above configuration can greatly reduce the risk and enhance the yield rate of the TFT-LCD array substrate.

In one embodiment, the fast testing switch device is arranged on one TFT-LCD array substrate for switching the testing signals, which are designated to test the display area of the TFT-LCD array substrate. The fast testing switch device includes at least a control chip for generating and transmitting the switch control signals and a first switch TFT. The gate of the first switch TFT connects to the control chip and one testing block for receiving the switch control signals from the testing block and for receiving the switch control signals from the control chip. The source of the first switch TFT connects to one data testing line and gate testing line. The drain of the first switch TFT connects to the corresponding data line or gate line of the display area.

Figure 3:
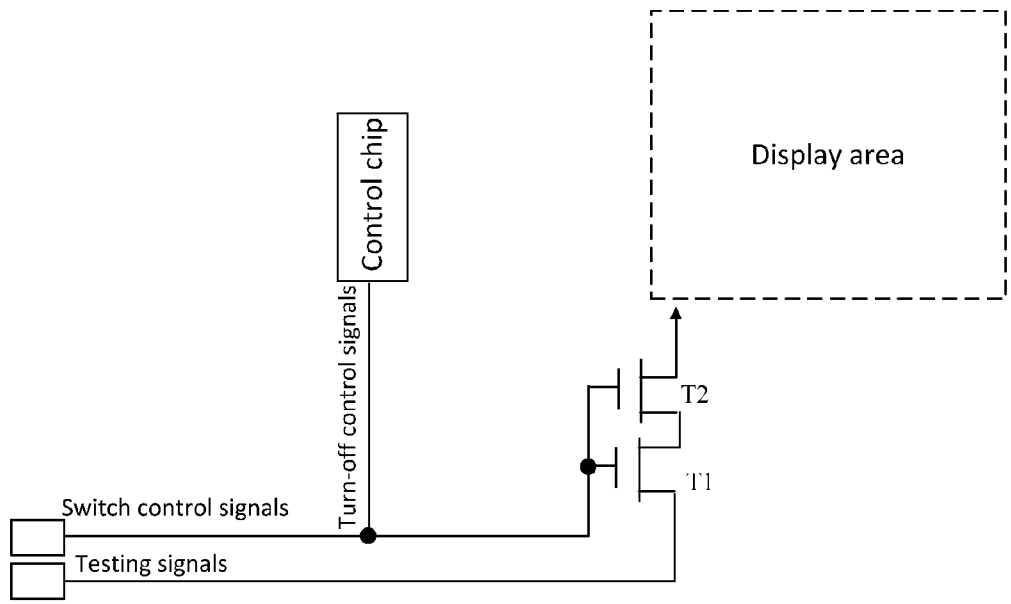
FIG. 3 is a schematic view of a fast testing switch device in accordance with one embodiment.

FIG. 3 is a schematic view of the fast testing switch device of one TFT-LCD array substrate in accordance with one embodiment. In one embodiment, the fast testing switch device includes a first switch TFT and a second switch TFT. The gate of the first switch TFT connects to the control chip and the testing block for receiving the switch control signals from the testing block and for receiving the switch control signals from the control chip. The source of the first switch TFT connects to one data testing line and gate testing line. The gate of the second switch TFT connects to the gate of the first switch TFT. The source of the second switch TFT connects to the drain of the first switch TFT. The drain of the second switch TFT connects to the corresponding data line or gate line of the display area.

Figure 4:
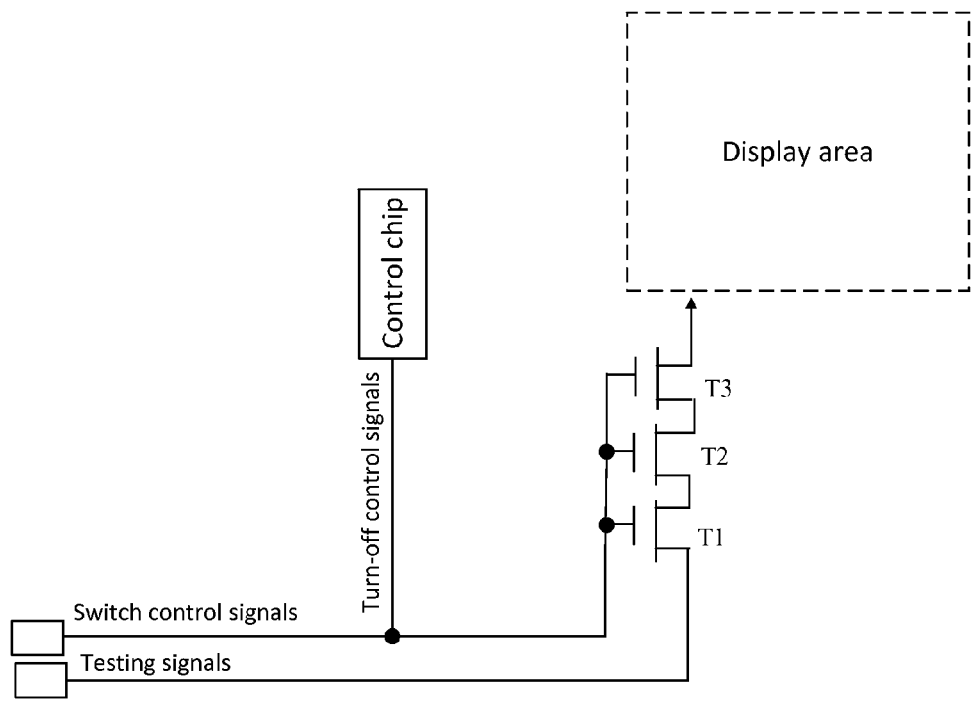
FIG. 4 is a schematic view of a fast testing switch device in accordance with another embodiment.

FIG. 4 is a schematic view of a fast testing switch device of the TFT-LCD array substrate in accordance with another embodiment. The fast testing switch device includes a first switch TFT, a second switch TFT, and a third switch TFT. The gate of the first switch TFT connects to the control chip and the testing block for receiving the switch control signals from the testing block and for receiving the switch control signals from the control chip. The source of the first switch TFT connects to one data testing line and gate testing line. The gate of the second switch TFT connects to the gate of the first switch TFT. The source of the second switch TFT connects to the drain of the first switch TFT. The gate of the third switch TFT connects to the gate of the second switch TFT. The source of the third switch TFT connects to the drain of the second switch TFT. The drain of the third switch TFT connects to the corresponding data line or gate line of the display area.

Specifically, when the first switch TFT receives the switch control signals from the testing block and the switch control signals are the first level signals, the gate and drain of the switch TFTs are turn on so as to transmit the data testing signals or/and gate testing signals to the display area. When the first switch TFT receives the switch control signals from the testing block and the switch control signals are the second level signals, the gate and drain of the switch TFTs are turn off so as to stop transmitting the data testing signals or/and gate testing signals to the display area. When the first switch TFT receives the turn-off control signals from the control chip, the gate and drain of each of the TFTs are turn off.

The details of the fast testing switch device can be understood by referencing the above descriptions regarding FIGS. 1 and 2.

In view of the above, the TFT-LCD array substrate includes fast testing switch devices for switching the TFTs. As such, the space occupied by the testing lines is decreased so as to achieve the narrow-bezel design.

The control chips transmit turn-off control signals to the fast testing switch devices such that the all of the fast testing switch devices are in the normal off-state when the liquid crystal panel including the TFT-LCD array substrate is in its normal operation.

The fast testing switch device includes at least two switch TFTs. When the liquid crystal panel including the TFT-LCD array substrate is in its normal operation, the data line or gate line of the display is prevented from short-connection causing by a malfunctioned switch TFT. In this way, the crosstalk can be avoided such that the yield rate of the TFT-LCD array substrate is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A TFT-LCD array substrate having a display area and a peripheral area surrounding the display area, the display area comprises a plurality of gate lines and data lines connecting to TFTs arranged within the display area, the peripheral area comprising:
    a plurality of data testing lines for respectively transmitting data testing signals to each of the data lines in the display area;
    a plurality of gate testing lines for sending gate testing signals to the gate lines within the display area;
    a common electrode line for providing a common electrode for the TFTs within the display area; and
    wherein each of the data testing lines and the gate testing lines comprise a fast testing switch device for connecting or disconnecting the data testing lines and the gate testing lines with the display area when being controlled by external switch control signals; and
    wherein the fast testing switch device comprises at least one first switch TFT, a gate of the first switch TFT connects to at least one control chip and a testing block for receiving the switch control signals from the testing block or turn-off control signals from the control chip, a source of the first switch TFT connects to one data testing line or one gate testing line, and a drain of the first switch TFT connects to the corresponding data line or gate line of the display area, wherein the testing block is arranged on a starting end of each of the data testing lines and the gate testing lines; and
    wherein the fast testing switch device is turned off upon receiving the turn-off control signals.

2. The TFT-LCD array substrate as claimed in claim 1, wherein the turn-off control signals are low level signals or ground signals.

3. The TFT-LCD array substrate as claimed in claim 1, wherein the fast testing switch device further comprises a second switch TFT, a gate of the second switch TFT connects to the gate of the first switch TFT, the source of the second switch TFT connects to the drain of the first switch TFT, and a drain of the second switch TFT connects to the corresponding data line or gate line of the display area.

4. The TFT-LCD array substrate as claimed in claim 1, wherein the fast testing switch device further comprises a second switch TFT, and a third switch TFT, the gate of the second switch TFT connects to the gate of the first switch TFT, the source of the second switch TFT connects to the drain of the first switch TFT, the gate of the third switch TFT connects to the gate of the second switch TFT, the source of the third switch TFT connects to the drain of the first switch TFT, and a drain of the third switch TFT connects to the corresponding data line or gate line of the display area.

5. The TFT-LCD array substrate as claimed in claim 4, wherein when the first switch TFT receives the switch control signals from the testing block and the switch control signals are first level signals, the gate and drain of the switch TFTs are turn on so as to transmit the data testing signals or/and gate testing signals to the display area, when the first switch TFT receives the switch control signals from the testing block and the switch control signals are the second level signals, the gate and drain of the switch TFTs are turn off so as to stop transmitting the data testing signals or/and gate testing signals to the display area, and when the first switch TFT receives the turn-off control signals from the control chip, the gate and drain of each of the switch TFTs are turn off.

6. A TFT-LCD array substrate having a display area and a peripheral area surrounding the display area, the display area comprises a plurality of gate lines and data lines connecting to TFTs arranged within the display area, the peripheral area comprising:
    a plurality of data testing lines for respectively transmitting data testing signals to each of the data lines in the display area;
    a plurality of gate testing lines for sending gate testing signals to the gate lines within the display area;
    a common electrode line for providing a common electrode for the TFTs within the display area;
    at least one control chip connecting with a fast testing switch device for transmitting turn-off control signals; and
    wherein each of the data testing lines and the gate testing lines comprise the fast testing switch device for connecting or disconnecting the data testing lines and the gate testing lines with the display area when being controlled by external switch control signals; and
    wherein the fast testing switch device comprises at least one first switch TFT, a gate of the first switch TFT connects to one control chip and a testing block for receiving the switch control signals from the testing block or the turn-off control signals from the control chip, a source of the first switch TFT connects to one data testing line or one gate testing line, and a drain of the first switch TFT connects to the corresponding data line or gate line of the display area, wherein the testing block is arranged on a starting end of each of the data testing lines and the gate testing lines; and
    wherein the fast testing switch device is turned off upon receiving the turn-off control signals.

7. The TFT-LCD array substrate as claimed in claim 6, wherein the turn-off control signals are low level signals or ground signals.

8. The TFT-LCD array substrate as claimed in claim 7, wherein when the first switch TFT receives the switch control signals from the testing block and the switch control signals are first level signals, the gate and drain of the first switch TFT are turn on so as to transmit the data testing signals or/and gate testing signals to the display area, when the first switch TFT receives the switch control signals from the testing block and the switch control signals are second level signals, the gate and drain of the first switch TFT are turn off so as to stop transmitting the data testing signals or/and gate testing signals to the display area, and when the first switch TFT receives the turn-off control signals from the control chip, the gate and drain of the first TFTs are turn off.

9. The TFT-LCD array substrate as claimed in claim 7, wherein the fast testing switch device further comprises a second switch TFT, the gate of the second switch TFT connects to the gate of the first switch TFT, the source of the second switch TFT connects to the drain of the first switch TFT, and a drain of the second switch TFT connects to the corresponding data line or gate line of the display area.

10. The TFT-LCD array substrate as claimed in claim 9, wherein when the first switch TFT receives the switch control signals from the testing block and the switch control signals are first level signals, the gate and drain of the first and the second switch TFTs are turn on so as to transmit the data testing signals or/and gate testing signals to the display area, when the first switch TFT receives the switch control signals from the testing block and the switch control signals are the second level signals, the gate and drain of the first and the second switch TFTs are turn off so as to stop transmitting the data testing signals or/and gate testing signals to the display area, and when the first switch TFT receives the turn-off control signals from the control chip, the gate and drain of the first and the second switch TFTs are turn off.

11. The TFT-LCD array substrate as claimed in claim 7, wherein the fast testing switch device further comprises a second switch TFT, and a third switch TFT, the gate of the second switch TFT connects to the gate of the first switch TFT, the source of the second switch TFT connects to the drain of the first switch TFT, the gate of the third switch TFT connects to the gate of the second switch TFT, the source of the third switch TFT connects to the drain of the first switch TFT, and a drain of the third switch TFT connects to the corresponding data line or gate line of the display area.

12. The TFT-LCD array substrate as claimed in claim 11, wherein when the first switch TFT receives the switch control signals from the testing block and the switch control signals are first level signals, the gate and drain of the switch TFTs are turn on so as to transmit the data testing signals or/and gate testing signals to the display area, when the first switch TFT receives the switch control signals from the testing block and the switch control signals are the second level signals, the gate and drain of the switch TFTs are turn off so as to stop transmitting the data testing signals or/and gate testing signals to the display area, and when the first switch TFT receives the turn-off control signals from the control chip, the gate and drain of each of the switch TFTs are turn off.

* * * * *